United States Patent

[11] 3,599,496

[72] Inventor Pierre Toulier
Ville D'Avray, France
[21] Appl. No. 861,099
[22] Filed Sept. 25, 1969
[45] Patented Aug. 17, 1971
[73] Assignee Societe Anonyme D.B.A.
[32] Priority Sept. 27, 1968, Dec. 4, 1968
[33] France
[31] 167,901 and 176,562

[54] STARTER DRIVE
13 Claims, 6 Drawing Figs.
[52] U.S. Cl. .................................................. 74/7
[51] Int. Cl. .............................................. F02n 11/00
[50] Field of Search .................................. 74/7, 6

[56] References Cited
UNITED STATES PATENTS
3,465,353 9/1969 Buxton et al. .................. 74/7

*Primary Examiner*—Milton Kaufman
*Attorneys*—Robert A. Benziger and Plante, Arens, Hartz, Smith & Thompson ABSTRACT: The starter drive has a driving unit mounted on and in threaded engagement with a driving shaft which is automatically advanced into driving engagement with a part of the engine as a result of said threaded engagement when it is retarded relatively to rotation of the driving shaft by a braking device. The latter comprises a nonrotatable axially movable friction plate slipped on the driving unit and frictionally engaged by friction washer means driven in rotation by the latter and resiliently urged against said plate, resilient return means opposing the advance of said driving unit. Said resilient return means consist of a spring means compressed between the friction plate and the housing structure, said friction plate being squeezed between said friction washer means and a thrust ball bearing supporting the load of said spring means.

PIERRE TOULIER
INVENTOR
Robert A. Benziger

STARTER DRIVE

This invention relates to a starter drive for an internal combustion engine.

It has already been proposed in applicant's U.S. Pat. No. 3,299,719 a starter drive for an internal combustion engine having a driving unit which is mounted on and in threaded engagement with a driving shaft, the driving unit being automatically advanced into driving engagement with a part of the engine as a result of said threaded engagement when it is retarded relatively to rotation of the driving shaft by a braking device which comprises a nonrotatable axially movable friction plate slipped on said driving unit and frictionally engaged by friction washer means driven in rotation by the latter and resiliently urged against said plate, resilient return means opposing the advance of said driving unit.

In this prior device, the friction plate was squeezed between two washers rotatably driven by the driving unit and resiliently urged one toward the other against a snapring mounted on said driving member by resilient compression means coaxial to the latter. With such an arrangement the friction forces exerted between the washers and the friction plate were substantially increasing with the advance of the driving unit or, in other words, when the pinion approached or engaged the engine-toothed wheel. A substantial portion of the energy generated by the electrical motor was thus lost in the braking device instead of being transmitted to the pinion-toothed wheel assembly.

The starter drive of the invention is of the type described hereinabove and is characterized in that said resilient return means consist of a spring means compressed between said friction plate and the housing structure, said friction plate being squeezed between said friction washer means and a thrust ball bearing or the like supporting the load of said spring means.

It appears easily that with such a characterizing feature there is obtained a complete independence between the resilient return means acting on the friction plate and the resilient means urging the friction washer means against said plate. Furthermore since the friction plate is applied against a thrust ball bearing which supports the load of the spring constituting said return means the compression of said spring does not add to the friction forces which only depend from the resilient means acting on said friction washer means.

According to the invention, there are provided means for interrupting the advance of the friction plate after a given advance of the pinion in the toothed wheel and for suppressing subsequently the frictional engagement of the washer means with the friction plate. These new features and the advantages resulting therefrom are also due to the above general feature.

The starter drive of the invention now permits a complete transmission of the energy to the engine to be started without any loss due to the friction in the starter drive assembly.

The invention will now be described with reference to the accompanying drawing in which.

Figure 1:
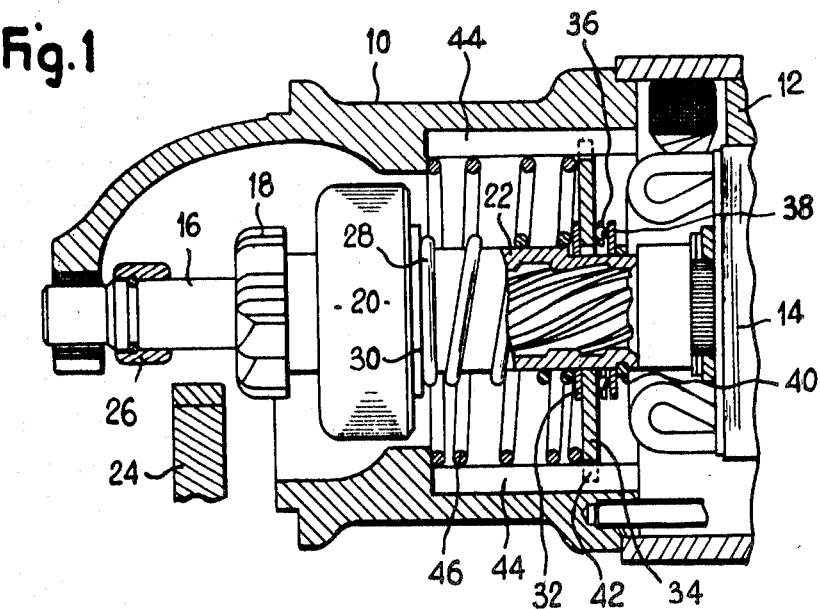
FIGS. 1 and 2 show a starter drive according to a first embodiment of the invention, with parts broken away, respectively in the retracted and advanced positions.
Figure 2:
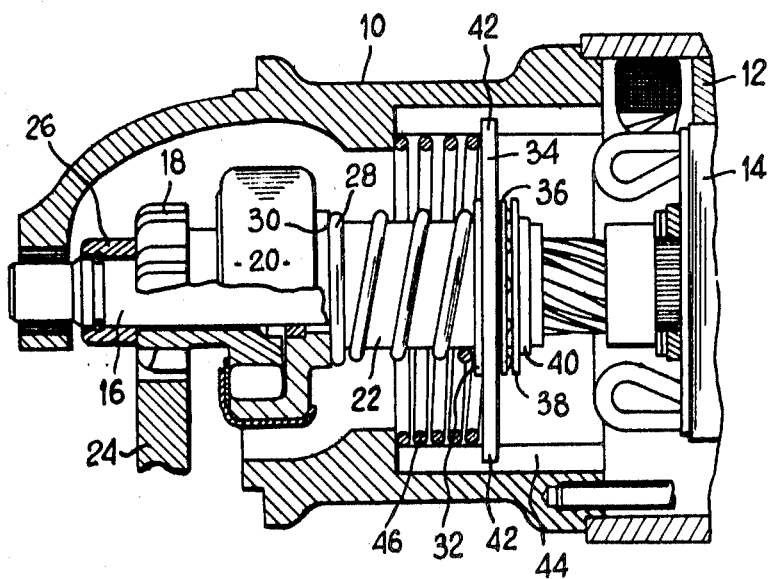

The starter drive of FIGS. 1 and 2 comprises a housing structure 10 including a stator 12 in which is rotated a rotor 14 having a driving shaft 16 on which is threadedly mounted a driving unit comprising a pinion 18, a free wheel 20 connected thereto and a threaded sleeve member or driving member 22 connected to the other side of said free wheel. The splined sleeve member 22 cooperates with the corresponding splines of shaft 16. Upon helical motion of said driving unit, pinion 18 engages a toothed wheel 24 driving in rotation an internal combustion engine. At the end of its stroke pinion 18 is brought in abutment against a ring 26 fixed to shaft 16.

A compression spring 28 is slipped on sleeve member 22, said spring is compressed between a shoulder 30 of said sleeve member connected to the free wheel and on a washer 32 which is urged toward the lateral face of a friction plate 34 which is in contact by its other face with a thrust ball bearing 36 or the like, the latter being in abutment against a washer 38 which in turn bears against a snapring 40 inserted in a groove provided in sleeve member 22. Washer 32 is adapted to cooperate with a flat surface machined on the sleeve member so as to be driven in rotation therewith.

Friction plate 34 is provided with diametrically opposed lugs 42 in which are cut notches cooperating with longitudinal ribs 44 extending on the inner walls of the housing structure 10 parallely to the axis of the shaft 16. With such an arrangement plate 34 is capable of axial displacements against a helical return spring 46 whereas its rotation is forbidden.

The operation of the starter drive described hereinabove is the following:

The electrical starting motor being energized, the splines of the shaft 16 cooperate with the corresponding splines of the sleeve member 22, the rotary motion of which is restrained by the friction effect of plate 34 on washer 32 pressed against the latter by spring 28. It results therefrom that the unit constituted by pinion 18 free wheel 20 and sleeve member 22 is pushed to mesh with the toothed wheel 24 until pinion 18 abuts stop ring 26.

It is to be noted that after the teeth of the pinion have started meshing with the teeth of the toothed wheel the internal combustion engine being still unstarted, the pinion is restrained in rotation by the toothed wheel and its axial travel in the teeth of the latter continues without any further use of the friction effect of the friction plate against the washer said effect having only facilitated the initial meshing engagement.

It may be seen when considering FIGS. 1 and 2 that during the advance of the pinion toward the toothed wheel the force exerted by spring 28 on washer 32 did not change and that even though spring 46 acting upon plate 34 has been compressed said spring 46 has not modified the friction exerted on the sleeve 22 thanks to the provision of the thrust ball bearing 36 which is practically frictionless. Thus in this embodiment the friction effect remains unchanged during all the duration of the advance of the pinion toward the toothed wheel and does not increase as was the case in the prior devices.

The complete independence of the two springs 28 (urging the washer toward the friction plate) and 46 (returning the sleeve member in retracted position) also permits the obtainment of an improvement described with reference to FIGS. 3 and 4 which consists of suppressing the action of spring 28 at the end of the stroke of the pinion.

Figure 3:
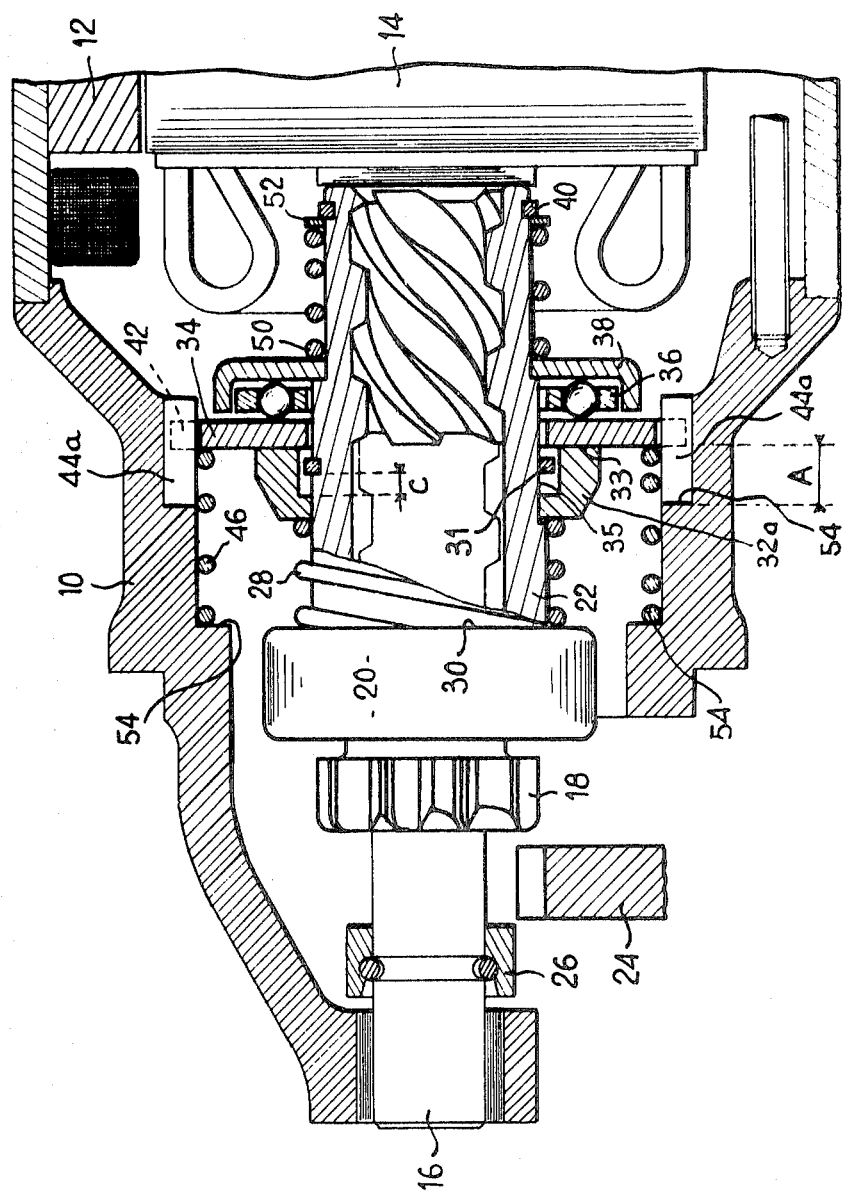
FIGS. 3 and 4 show a starter drive according to a second embodiment of the invention, with parts broken away respectively in retracted and advanced positions.
Figure 4:
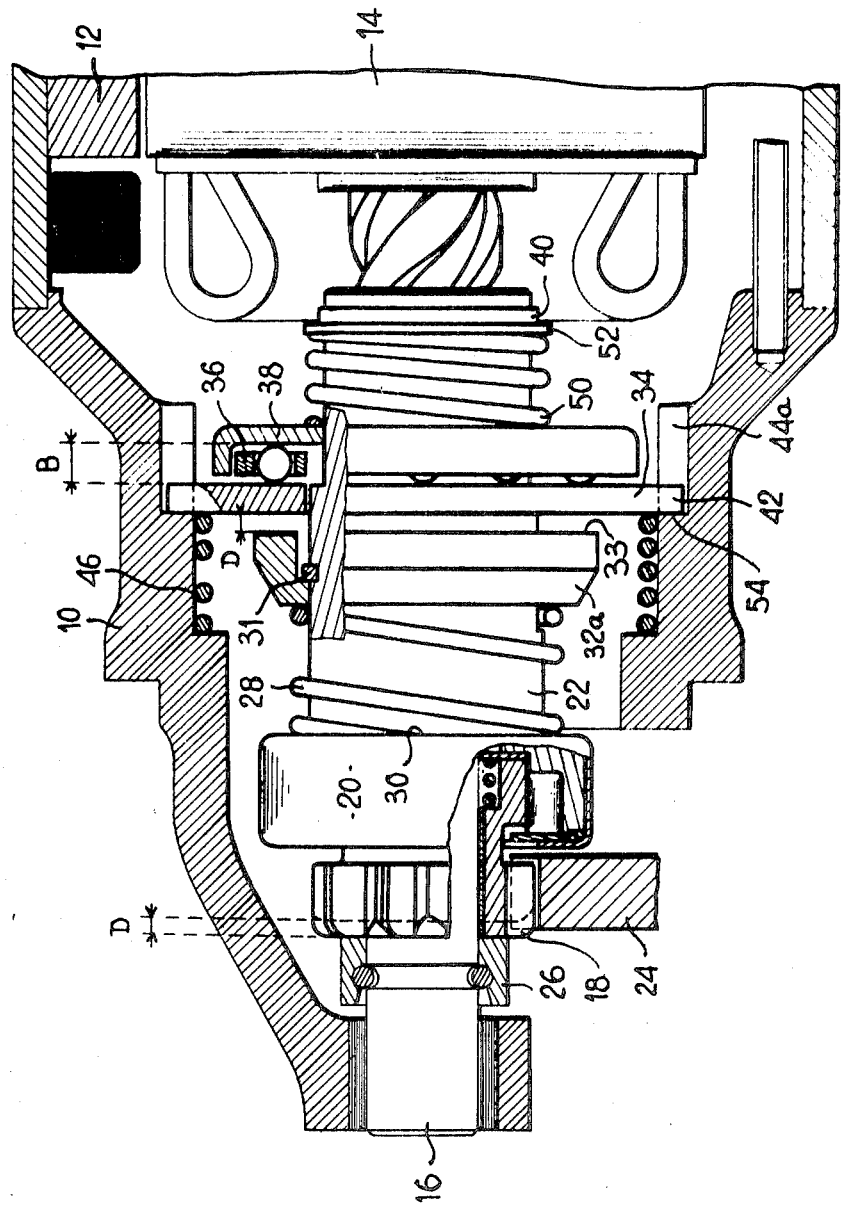

In FIGS. 3 and 4 the same reference numeral designate parts that are similar to those already described above with reference to FIGS. 1 and 2.

The modifications made in the second embodiment are the following:

A spring 50 and an abutment ring 52 slipped on the sleeve member 22 have been interposed between the thrust ball bearing 36, 38 and the snapring 40.

The ribs 44A constituting guiding members for friction plate 34 are of a smaller length than the ribs 44 of the first embodiment and the plate 34 engages an abutment 54 of the housing 10 after an advance stroke of a length A as shown in FIG. 3.

In the embodiment of FIGS. 3 and 4, the washer 32 of the first embodiment is replaced by a ring 32a which is cup-shaped and is adapted to engage the friction plate 34 by its edge 33. A flat 35 is provided on the sleeve member 22 to drive ring 32a in rotation. The cup-shaped ring 32a is slidably mounted on the sleeve member and a snapring 31 or the like is confined in ring 32a. Snap ring 31 is located at a distance C from the bottom of ring 32a when the starter drive is in the released position as viewed in FIG. 3.

The operation of the starter drive comprising the above modifications will now be described with reference to FIGS. 3 and 4.

The starter drive being in its released position of FIG. 3, the electrical starting motor is energized. The splines of shaft 16 cooperate with the corresponding splines or sleeve member 22. The rotary motion is restrained by the friction effect of plate 34 on ring 32a pressed against the latter by spring 28. The starter drive assembly comprising pinion 18, free wheel 20, sleeve member 22 advance toward the left of FIG. 3. The structure comprising ring 32a, friction plate 34, thrust bearing 36 and washer plate 38 advances simultaneously of a distance A after which friction plate 34 engages abutments 54 at the end of ribs 44a under the action of spring 50 the force of which is larger than the one of pring 46. At this moment, the pinion 18 has penetrated into toothed wheel 24 of a length A and, the electrical motor continuing its rotation, the axial travel of the pinion will continue, as well as the axial travel of the associated elements (free wheel 20, sleeve member 22 spring 28, ring 32a and snapring 31). This further axial travel due to the cooperation of the splines, the pinion being introduced in the teeth of the wheel goes on until the pinion abuts the stop ring 26 as viewed on FIG. 4.

The total advance of the pinion between the position shown in FIG. 3 and the one shown in FIG. 4 is of A+B. The distance B appears on FIG. 4 and corresponds to the travel the abutment of washer 38 provided on sleeve 22 moves away from said washer 38. The distance C between the bottom of friction ring 32a and snapring 31 being smaller than B of a quantity D the snapring 31 engages ring 32a the end of the stroke of the starter drive and when the pinion 18 abuts the stop ring 26 the edge 33 of ring 32a will be at a distance of D away from friction plate 42. The distance D has been repeated on FIG. 4 by means of an interrupted line showing the position of the pinion 18 when the friction effect ceases to be applied to the sleeve member. This distance D is equal to the difference B–C. When the pinion is in a position comprised between the one shown in interrupted line and the one in abutment against stop ring 26 no friction loss due to the braking device (ring 32a— plate 34) exists anymore. There exists only a very small opposition to rotation due to the presence of the thrust bearing which may however be considered as negligible.

It is evident that to obtain a good operation of the starter drive the forces of the springs 28, 46 and 50 have to be chosen conveniently. The load of spring 28 has to be chosen so as to provide the correct friction effect necessary to start the advance of the pinion against the parasitic frictions encountered. The load of spring 46 which constitutes the return spring of plate 34 can be chosen for this purpose only, independently of the one of spring 28. Finally the load of spring 50 has to be such that the force of said spring be greater than the sum of the forces of spring 28 and 46 together so as to bring washer 38 in abutment against the shoulder provided therefor on sleeve member 22.

Figure 5:
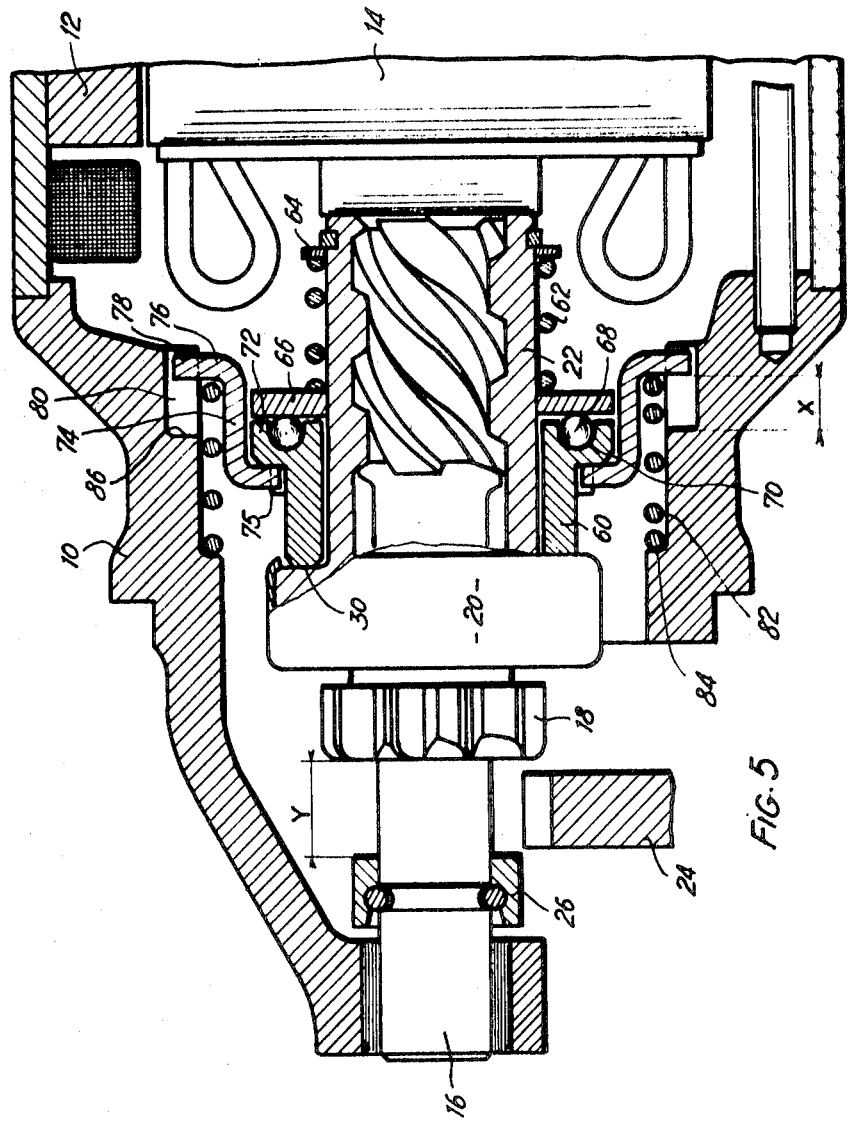
FIGS. 5 and 6 show a starter drive according to a third embodiment of the invention, with parts broken away respectively in retracted and advanced position.
Figure 6:
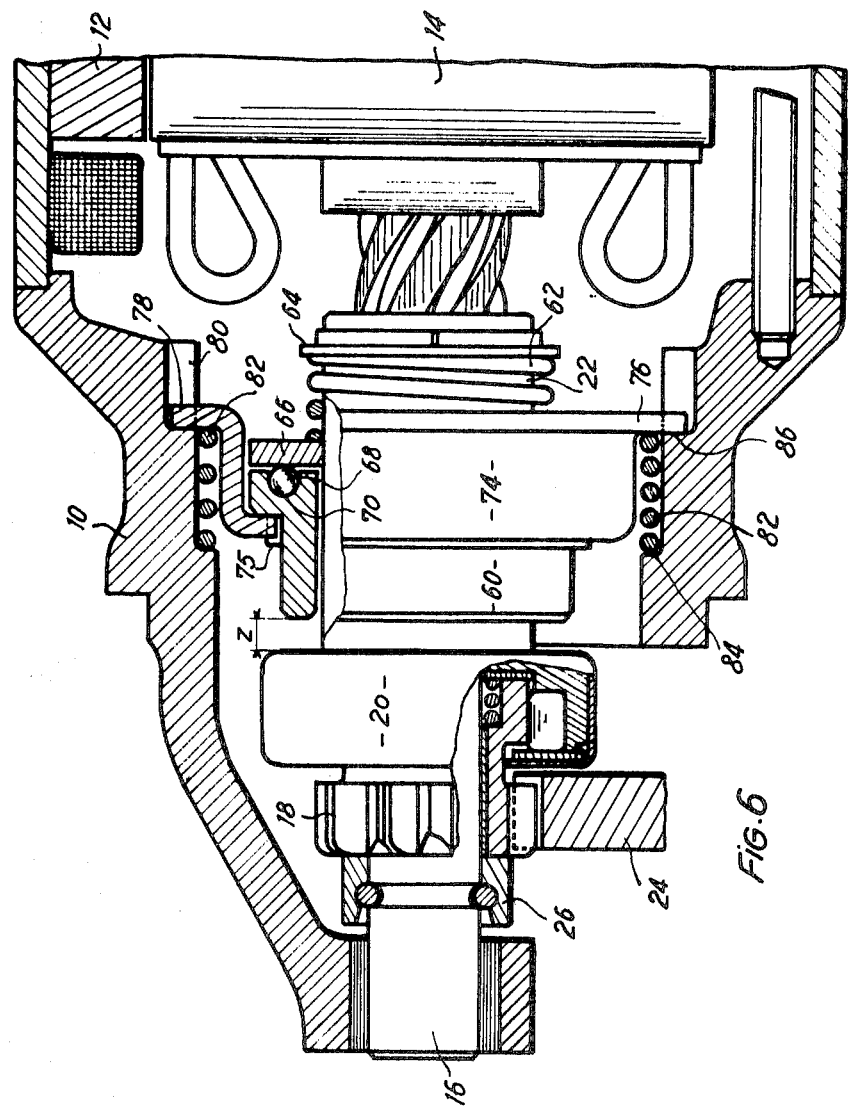

The starter drive of FIGS. 5 and 6 comprises a housing structure 10 including a stator 12 in which is rotated a rotor 14 having a driving shaft 16 on which is threadedly mounted a unit comprising a pinion 18, a free wheel 20 connected thereto and a threaded sleeve member or driving member 22 connected to the other side of said free wheel. The splined sleeve member 22 cooperates with the corresponding splines of shaft 16. Upon helical motion of said unit, pinion 18 engages a toothed wheel 24 driving in rotation an internal combustion engine. At the end of its stroke pinion 18 is brought in abutment against a ring 26 fixed to shaft 16.

In the embodiment of FIGS. 5 and 6, the friction is obtained on sleeve member 22 by urging against a shoulder 30 of the latter (which is the lateral face of free wheel 20 in the shown example) the lateral face of a tubular member 60. This tubular member 60 is urged toward shoulder 30 by a spring 62 compressed between a stop ring 64 of sleeve member 22 and a washer 66 slipped over said sleeve member 22 and constituting a part of a thrust ball bearing the balls 68 of which are located in recesses 70 provided in a radial flange 72 provided at the end of tubular member 60 which is opposite to the one cooperating with shoulder 30. The tubular member 60 is received in the central opening of an annular member 74 which is cup-shaped and with which it constitutes the friction plate of the instant embodiment. Tubular member 60 comprises radial projections 74, adjacent to flange 72, which cooperate with corresponding slots provided in the central opening of annular member 74. The latter comprises on its external radial flange 76 lugs 78 which extend radially to cooperate with guiding grooves 80 extending axially in the housing of the starter drive.

Annular member 74 may be suitable made of plastic material whereas the tubular member 70 is made of a material having good friction characteristics at least at its end which cooperates with shoulder 30. A helical return spring 52 is located between a shoulder 84 of housing 10 and the radial flange 76 of annular member 74. This spring 82 is compressed during the advance stroke of the starter drive toward the toothed wheel 24. This displacement causes the driving of the structure comprising friction plate 60—74 until the lug 78 of member 74 of this structure engage the ends 86 of groove 80.

The operation of the starter drive of FIGS. 5 and 6 will be now described hereinafter:

The starter drive being in its released position of FIG. 5, the electrical starting motor is energized, the shaft 16 cooperates with the corresponding splines of sleeve member 22. The rotary motion is restrained by the friction effect of tubular member 60 of the friction plate acting on the shoulder 30 located between the sleeve member 22 and the free wheel 20. The starter drive assembly comprising pinion 18, free wheel 20 and sleeve member 22 advances toward the left of FIG. 5. The friction plate which comprises tubular member 60 and annular member 74 is driven in translation by the radial annular flange of member 60 but is not rotatably driven because of the cooperation of lugs 78 with grooves 80. This advance of the friction plate assembly is caused by the thrust of spring 62 acting against washer 66 which in turn pushes the member 60 through the intermediary of balls 68. The friction plate advances of a distance equal to X at the end of which the lugs 78 engage the ends 86 of the guiding grooves. The starter drive assembly comprising the pinion, the free wheel and the sleeve member continues to advance to a total distance Y at the end of which pinion 18 engages stop ring 26 as viewed in FIG. 6. Distance being chosen larger than X, at the end of stroke X the pinion, the free wheel and the sleeve member alone continue to advance and the end of tubular member 60 exerts no more an friction effect on shoulder 30 of sleeve member 22. When the starter drive is at the end of its stroke, the end of tubular member 60 is at a distance of shoulder 30 which is equal to the distance Z corresponding to the difference: Y less X. It results therefrom that during the last portion of the stroke of the starter drive, when the pinion is at the distance which is smaller than Z from the stop ring 26, said starter drive is no longer submitted to any friction effect and all the power of the electrical motor is transmitted to the pinion.

It is obvious that to obtain a correct operation of the starter drive, the force of spring 62 has to be larger than the one of the return spring 82.

The embodiment of FIGS. 5 and 6, the starter drive assembly comprising a pinion, free wheel and sleeve member have been shown in a starter drive housing similar to the one of FIGS. 3 and 4, but it is evident that the length of the tubular member 60 could have been substantially reduced, to the half of the one shown, which would permit a substantial reduction of the overall size of the device.

What I claim is,

1. A starter drive for an internal combustion engine having a housing a driving member in the housing having an abutment means, the driving member being in threaded engagement with a driving shaft and operatively connected through a one-way clutch to a drive pinion, the driving member advanceable on the shaft to engage the pinion with a part of the engine for starting the engine when said driving member is rotationally retarded with respect to the driving shaft by a braking device which comprises a nonrotatable axially movable friction assembly slipped on said driving member and having two opposed friction surfaces, a low-friction bearing mean mounted on said driving member in proximity to the abutment means and having a low-friction surface arranged to cooperate with one of said opposed friction surfaces, high-friction means providing a high-friction surface mounted on said driving member and arranged to have aid high-friction surface cooperate with the other of said opposed friction surfaces, resilient return means opposing the advance of said driving member and including a spring means compressed between said friction assembly and the housing, said spring means urging said friction assembly toward the abutment means whereby the low friction bearing means support the load of said spring means.

2. A starter drive according to claim 1, wherein said spring means compressed between said friction assembly and the housing structure comprises a helical spring coaxial to said driving member.

3. A starter drive according to claim 2, wherein a first compression spring slipped on said driving member is interposed between said low friction bearing means and said abutment means.

4. A starter drive according to claim 3, wherein axially extending guiding means are provided between said friction assembly and the housing having stop means in the housing interrupting the advance of said assembly after a given advance of said driving member.

5. A starter drive according to claim 4, wherein said high-friction means comprises a ring member slipped on said driving member and urged by a second compression spring also slipped on said driving member toward an abutment of said driving member whereby at the end of the advance of said driving member, after said friction assembly has engaged the aforesaid stop means, said abutment engages said ring member which is thus moved away from said friction assembly plate.

6. A starter drive according to claim 5, wherein said first compression spring has a force which is greater than the sum of the forces of said helical spring and second compression spring.

7. A starter drive according to claim 2, wherein said high-friction surface consists of the lateral face of a shoulder provided on said driving member and said friction assembly is urged by said first compression spring to frictionally engage said lateral face.

8. A starter drive according to claim 7, wherein said friction assembly comprises a cup-shaped annular element provided with a central opening in which is slipped a tubular member provided with a flange at one end thereof and with axial extension at its other end, said tubular member being slipped over said driving member and said flange cooperating with the edge of said opening, means being provided to connect said tubular member and said annular element.

9. A starter drive according to claim 8, wherein said low-friction bearing means are thrust ball bearing means, the lateral external face of said flange being provided with recesses for receiving the balls of said thrust ball bearing means the latter also comprising a ring applied against said balls by said first compression spring.

10. A starter drive according to claim 9, wherein said ring said ball bearing is confined in said cup-shaped annular element.

11. A starter drive according to claim 8, wherein said tubular member is provided with at least one radial rib cooperating with at least one radial slot in said opening of the cup-shaped annular element of said friction assembly.

12. A starter drive according to claim 7 wherein when the starter drive is in its released condition, the distance between said friction assembly and said stop means interrupting the advance thereof is smaller than the displacement of said driving member providing the full driving engagement thereof.

13. A starter drive according to claim 7 wherein the force of said first compression spring located between said low-friction bearing means and said abutment means of the driving member is greater than the force of said spring means compressed between said friction assembly and the housing structure.